United States Patent Office 3,092,638
Patented June 4, 1963

3,092,638
SYNTHESIS OF 2-PYRROLIDONE
Hsiang P. Liao, Baltimore, and William B. Tuemmler, Catonsville, Md., assignors to FMC Corporation, New York, N.Y., a corporation of Delaware
No Drawing. Filed July 17, 1961, Ser. No. 124,357
2 Claims. (Cl. 260—326.5)

This application relates to the preparation of 2-pyrrolidone. More particularly, it relates to the synthesis of 2-pyrrolidone from succinimide.

2-pyrrolidone is commercially prepared at the present time by a four-step process. This process involves the reaction of acetylene with formaldehyde to produce 2-butyne-1,4-diol, which is reduced to 1,4-butanediol. This product is then catalytically dehydrogenated to γ-butyrolactone, which is converted to 2-pyrrolidone by reaction with ammonia.

It has been suggested that lactams can be produced by the hydrogenation of the corresponding imide using a nickel catalyst. However, Paden and Adkins reported in the Journal of the American Chemical Society, volume 58 (1936), page 2489, that attempts to obtain 2-pyrrolidone by the hydrogenation of succinimide over a nickel catalyst were not successful.

It is an object of this invention to provide a method of preparing 2-pyrrolidone from succinimide.

It has now been discovered that 2-pyrrolidone can be prepared from succinimide in good yield in a single reaction step which comprises reacting one mole of succinimide with at least about two moles of hydrogen and about 0.05–5 moles of ammonia in the presence of a catalytic amount of a hydrogenating metal selected from the group consisting of cobalt, nickel, ruthenium, palladium and platinum at a temperature of about 60–350° C. and a pressure of about 50–10,000 p.s.i.g. Surprisingly, when operating in the presence of ammonia, the succinimide is stabilized and side-reactions are suppressed, thus leading to the formation of 2-pyrrolidone in high yield.

Succinimide is a readily available commercial product which is prepared by heating succinic acid in a current of ammonia, or by distilling ammonium succinate. A useful procedure for the preparation of succinimide is described by Blatt in Organic Syntheses, collective volume 2, 1943, page 562.

The reductive ammonolysis of succinimide is suitably carried out by reacting succinimide, hydrogen, and ammonia in the presence of a hydrogenating catalyst. The reaction is illustrated by the equation:

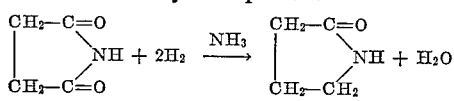

The reaction is carried out by charging an autoclave containing succinimide and the catalyst with a measured quantity of ammonia, preferably liquid ammonia under pressure. The vessel is then pressurized with hydrogen and heated to the reaction temperature. It is preferable to maintain the reaction medium in an agitated condition.

The reaction is suitably carried out at temperatures in the range of about 60–350° C. For best results, temperatures of about 200–250° C. should be employed. The pressure of the reaction should be maintained in the range of about 50–10,000 p.s.i.g., and preferably from about 500–2000 p.s.i.g. The reaction time may vary from about 15–300 minutes. Under the preferred operating conditions, the reaction is completed in about 35–60 minutes.

The reaction vessel should be charged with at least the stoichiometric amount of hydrogen; that is, at least two moles of hydrogen for each mole of succinimide. In practice, the amount of hydrogen present is generally in excess of two moles and is determined by the amount necessary to maintain the desired pressure.

The essential feature of the novel process disclosed herein is that at least about 0.05 mole of ammonia be present for each mole of succinimide. Hydrogenation of succinimide under optimum conditions, but in the absence of ammonia, results in an extremely low yield of impure product containing by-products boiling near pyrrolidone. The addition of ammonia to the reaction significantly reduces the formation of these by-products and greatly improves the yield of pyrrolidone. Excessive amounts of ammonia, such as more than about five moles per mole of succinimide, should be avoided since they degrade the product. Preferably, the ammonia should be present in an amount of about 0.1–1.0 mole per mole of succinimide. The following table illustrates the effect of varying the amount of ammonia when using a Raney cobalt catalyst at 250° C.

| Ammonia, mole per mole of succinimide | Pyrrolidone | |
|---|---|---|
|  | Percent purity of product fraction | Yield, percent of theory |
| 0 | 51 | 23 |
| 0.3 | 96 | 75 |
| 0.6 | 95 | 74 |
| 1.3 | 96 | 68 |
| 1.8 | 98 | 63 |

The hydrogenating metals which have been found to be suitable for catalyzing the novel reaction taught herein are cobalt, nickel, ruthenium, palladium and platinum. The catalyst should be present in an amount sufficint to catalyze the reaction at a reasonable rate; for example, at least about 2%. Preferably the catalytic material is present in an amount of about 5–10% by weight based on the succinimide. In the case of ruthenium, palladium and platinum, the metal should be supported on a carrier such as carbon or silica gel. Raney cobalt and Raney nickel are the preferred forms of these metals. The preparation of Raney metals is well known and is described, for example, by Schroter in Newer Methods of Preparative Organic Chemistry, Interscience Publishers, Inc. (1948), pages 65–67. Cobalt and nickel which have been stabilized by oxidation to the non-pyrophoric form as disclosed by Signaigo in Patent No. 2,166,183 may also be used.

The reaction may be carried out in the presence or absence of a reaction solvent. Although any solvent which is not reactive with ammonia may be used, solvents containing an ether linkage have been found to be particularly advantageous. Examples of these solvents include tetrahydrofuran, dioxane, methoxyethanol, and many others. Water may also be used as a solvent.

The following examples, illustrating the novel method disclosed herein for preparing 2-pyrrolidone, are presented without any intention that the invention be limited thereto. All precentages are by weight.

*Example 1*

A stirred autoclave was charged with 500 grams of succinimide, 45 grams of Raney cobalt, 26 grams of liquefied ammonia and 500 grams of tetrahydrofuran, and then pressurized with hydrogen. The contents of the reaction vessel were agitated and heated to a temperature of 250° C. for 33 minutes. The pressure was maintained in the range of 1350–1900 p.s.i.g. throughout this period. After cooling, the autoclave was vented and the crude product was filtered. The filtrate was first distilled at atmospheric pressure and then under reduced pressure. The yield of pyrrolidone boiling at 140–150° C. at 22 mm. Hg was 75% of theory. The product was analyzed by vapor phase chromatography and found to be 96% pure.

*Example 2*

A stirred autoclave was charged with 100 grams of succinimide, 11 grams of Raney cobalt, and 36 grams of liquefied ammonia, and then pressurized with hydrogen. The contents of the autoclave were agitated, and heated to a temperature of about 240° C. for 4.5 hours. The pressure was maintained at 4000 p.s.i.g. throughout this period. After cooling, the autoclave was vented and the crude product was removed and filtered to separate the catalyst. The filtrate was first distilled at atmospheric pressure, and then at 8.5 mm. Hg. The yield of pyrrolidone was 63% of theory and the product was 98% pure.

*Example 3*

A stirred autoclave was charged with 100 grams of succinimide, 5 grams of 5% ruthenium-on-carbon, 8 grams of liquefied ammonia and 101 grams of water, and then pressurized with hydrogen. The contents of the reaction vessel were heated to a temperature of 200° C. with stirring for 2 hours, while maintaining the pressure at 1220–2075 p.s.i.g. After cooling, the autoclave was vented, and the crude product was filtered. The filtrate was first distilled at atmospheric pressure, and then under reduced pressure. The yield of pyrrolidone was 57% of theory.

*Example 4*

A stirred autoclave was charged with 100 grams of succinimide, 3.4 grams of Raney cobalt, 3.4 grams of liquefied ammonia and 50 grams of 2-methoxyethanol, and then pressurized with hydrogen. The reaction mixture was heated at 250° C. for 100 minutes, while stirring and maintaining the pressure at 3000 p.s.i.g. After cooling, the autoclave was vented and the crude product was filtered. The filtrate was first distilled at atmospheric pressure, and then under reduced pressure. The yield of pyrrolidone was 62% of theory.

*Example 5*

A 1-gallon stirred autoclave was charged with 300 grams of succinimide, 500 grams of tetrahydrofuran, 28 grams of ammonia and 24 grams of 5% palladium-on-carbon, and then pressurized with hydrogen. The reaction medium was heated at 220° C. for 2 hours while maintaining the pressure at 1750 p.s.i.g. After cooling and venting the autoclave, the product was filtered to remove the catalyst. The filtrate was first distilled at atmospheric pressure and then at reduced pressure. The yield of pyrrolidone boiling at 132–136° C. at 11 mm. Hg was 54% of theory.

As will be apparent to those skilled in the art, numerous modifications and variations of the embodiments illustrated above may be made without departing from the spirit of the invention or the scope of the following claims.

We claim:

1. An improved method of preparing 2-pyrrolidone in good yield which comprises reacting one mole of succinimide with at least two moles of hydrogen and 0.05–5 moles of ammonia in the presence of a catalytic amount of a hydrogenating metal selected from the group consisting of cobalt, nickel, ruthenium, palladium and platinum at a temperature of 60–350° C. and a pressure of 50–10,000 p.s.i.g.

2. The improved method of claim 1 in which the reaction is carried out in the presence of Raney cobalt at a temperature of 200–250° C. and a pressure of 500–2000 p.s.i.g.

References Cited in the file of this patent

UNITED STATES PATENTS

| | | |
|---|---|---|
| 2,187,745 | Lazier | Jan. 23, 1940 |
| 2,843,600 | McKeever | July 15, 1958 |